No. 839,955. PATENTED JAN. 1, 1907.
C. C. REED & W. DUECKER.
BELT FASTENER.
APPLICATION FILED AUG. 17, 1905.

Witnesses
E. T. Stewart
R. F. Morrill

Clyde C. Reed and
William Duecker
Inventors by C. A. Snow & Co.
Attorneys

UNITED STATES PATENT OFFICE.

CLYDE C. REED AND WILLIAM DUECKER, OF MEMPHIS, TENNESSEE.

BELT-FASTENER.

No. 839,955.  Specification of Letters Patent.  Patented Jan. 1, 1907.

Application filed August 17, 1905. Serial No. 274,586.

*To all whom it may concern:*

Be it known that we, CLYDE C. REED and WILLIAM DUECKER, citizens of the United States, residing at Memphis, in the county of Shelby and State of Tennessee, have invented a new and useful Belt-Fastener, of which the following is a specification.

This invention relates to fasteners for the ends of leather belts, and has for one of its objects to produce a simply-constructed device of this character whereby the full strength of the belt is retained at the joint and without affecting the flexibility or materially decreasing the width.

Another object of the invention is to produce a simply-constructed device of this character whereby the belt is of uniform thickness at the joint, with the central portion at the joint slightly less flexible than the outer portions, whereby the belt is caused to bear with slightly greater force upon the outer portions of the pulley to correspondingly increase the grip of the belt thereon and decrease the tendency of the belt to run off from the pulley.

Another object of the invention is to produce a simply-constructed device of this character which will operate with equal efficiency upon "flat-faced" or "crown-faced" pulleys.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

Figure 1:
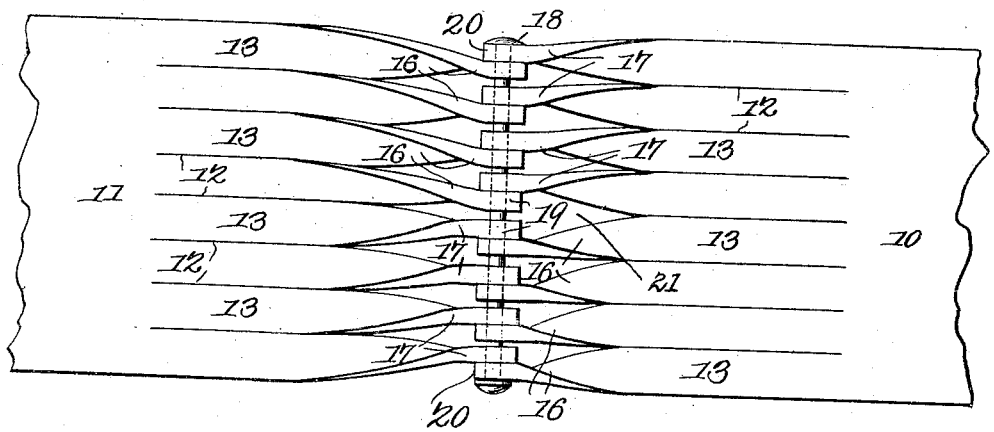
Figures 2, 3:
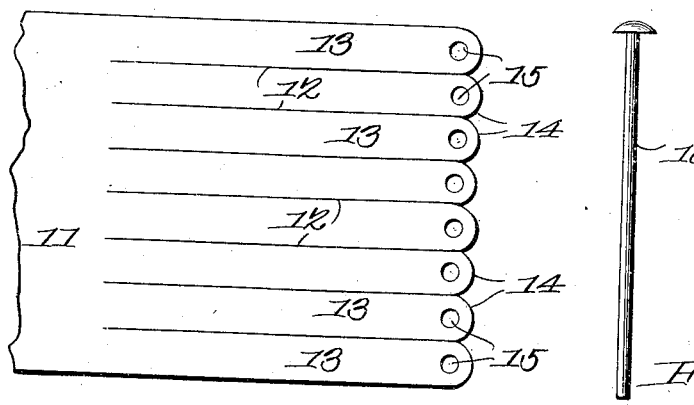

In the drawings, Figure 1 is a view of the adjacent end portions of a belt with the improved fastening means embodied therein. Fig. 2 is a view of one of the belt ends, illustrating the construction and its condition prior to the completion of the "joint." Fig. 3 represents the coupling-pin and its washer detached.

In the embodiment of the invention the ends of the belt to be coupled, and which are indicated, respectively, at 10 and 11, are each formed with a plurality of uniformly-spaced clefts 12, producing a corresponding series of tongues 13 of uniform width, the ends of the tongues being preferably rounded, as at 14, and each provided with a transverse aperture 15. Each tongue is then twisted into position at right angles to the face of the belt and the ends of the tongues of one belt end interlapped with those of the other belt end, so that the apertures 15 are disposed in transverse alinement to receive a holding-pin 18.

The tongues 13 are necessarily in even numbers, so that an equal number can be arranged upon each side of the center, the number of tongues varying with the width of the belt.

For the purpose of illustration the belt ends are shown formed with eight of the tongues in each. The tongues at the right of the center are twisted oppositely to those at the left, as shown in Fig. 1, and when united by the pin 18 the adjacent faces of the central pair of tongues on one belt end are disposed in close proximity, as at 19, while the inner faces of the central pair of tongues on the other belt end bear against the outer faces of the central pair of tongues on the first-mentioned belt end, thus leaving a relatively large open space, as at 21, centrally of the belt at the joint between its ends.

By this arrangement of the parts several important results are attained. First, the ends of the belt being precisely alike and provided with the same number of the tongues 13 and of uniform size throughout, the resistance imparted to the belt at each side of the joint is the same, and by twisting the tongues in opposite directions at each side of the center the resistance is uniformly away from or toward the center or transversely of the belt. Hence any tendency of the belt to run laterally of the pulley is effectually resisted, as the "grip" of the belt is uniform at all parts of the surface at the joint. The vacant space formed, as shown at 21, by the peculiar and novel arrangement of the tongues produces a slightly-decreased resistance and correspondingly-increased flexibility at the central portion of the belt at the joint, which also aids materially in the action by causing a slight increase in the pressure at each side of the center, this increase of pressure being uniform at each side of the center of the pulley. The twisting of the tongues in the opposite direction at each side of the center of the belt also effectually prevents the belt from curling and also prevents any tendency of the pin to draw obliquely to the belt.

Having thus described the invention, what is claimed as new is—

A belt-fastener comprising the belt ends each formed with an even number of tongues of equal width and with parallel sides with the tongues at opposite sides of the center reversely twisted at right angles to the faces of the belt so that the adjacent faces of the central pair of tongues of one belt end are disposed in close proximity and the adjacent faces of the central pair of tongues of the other belt end disposed against the outer faces of the first-mentioned central tongues, whereby a uniform open space is left centrally of the belt and the belt thereby rendered slightly more flexible centrally of the joint.

In testimony that we claim the foregoing as our own we have hereto affixed our signatures in the presence of two witnesses.

CLYDE C. REED.
WILLIAM DUECKER.

Witnesses:
JOHN E. COLBERT,
OTEY GRANBERRY.